United States Patent [19]
Abdo et al.

[11] 3,857,971
[45] Dec. 31, 1974

[54] RUMINANT FEED ADDITIVE AND METHOD OF PREPARING THE SAME

[75] Inventors: Kamal M. Abdo, Columbia, Md.; Glenn M. Cahilly, Olean, N.Y.

[73] Assignee: W. R. Grace Co., New York, N.Y.

[22] Filed: June 25, 1973

[21] Appl. No.: 373,263

Related U.S. Application Data

[63] Continuation-in-part of Ser. No. 330,906, Feb. 9, 1973, abandoned, which is a continuation of Ser. No. 46,813, June 16, 1970, abandoned, which is a continuation-in-part of Ser. No. 720,497, April 11, 1968, abandoned.

[52] U.S. Cl. .................... 426/53, 424/16, 424/93
[51] Int. Cl. .................... A23k 1/00, A61k 27/00
[58] Field of Search .......... 424/104, 93, 94, 14, 16; 426/53

[56] References Cited
UNITED STATES PATENTS

| | | | |
|---|---|---|---|
| 2,700,611 | 1/1955 | Jeffreys | 99/2 |
| 2,738,273 | 3/1956 | Muhrer | 99/2 |
| 2,970,911 | 2/1961 | Lorz | 99/2 |
| 3,041,289 | 6/1962 | Katchen et al. | 99/2 |
| 3,243,299 | 3/1966 | Mecho et al. | 99/2 |

*Primary Examiner*—Frederick E. Waddell
*Attorney, Agent, or Firm*—Charles L. Harness

[57] ABSTRACT

An improved feed additive for administration to ruminant animals having digestive upsets, resulting from imbalances of their rumen microbial population, which occur for various reasons, for example when the ruminants are shifted from a ration which is high in cellulose content to a ration which is high in starch content. The ruminant feed additive comprises rumen microorganisms adapted and cultured in vitro on a medium which is high in starch content. The method of the invention provides an in vitro adaptation and fermentation system for the production of selected rumen microorganisms.

12 Claims, No Drawings

RUMINANT FEED ADDITIVE AND METHOD OF PREPARING THE SAME

This application is a continuation-in-part of our copending application Ser. No. 330,906, filed Feb. 9, 1973, now abandoned, which in turn is a continuation of Ser. No. 46,811, filed June 16, 1970, now abandoned, which in turn is a continuation-in-part of application Ser. No. 720,497, filed Apr. 11, 1968, now abandoned.

This invention relates to a unique feed additive for ruminant animals. More particularly, the invention relates to a method for preparing an improved additive for ruminants containing cultures of rumen microflora or organisms, grown on a specific and defined medium for the purpose of inoculating ruminant animals with said additive for the enhancement of the digestion and assimilation of specific feed materials. The microorganisms cultures in accordance with this invention are herein variously called adapted rumen cells, adapted rumen microorganisms ("ARM") etc. For the sake of brevity, in the text, and especially in the Tables, the designation ARM is often used.

As is well-known, the ability of ruminant animals to digest cellulosic feeds or roughage, such as hay, straw, etc., to convert non-protein-nitrogen (NPN) compounds such as urea into organismal protein, as well as to synthesize many vitamins, is due to the presence of microorganisms or microflora in the rumen (first stomach) and also in the reticulum (second stomach) of the ruminant animals.

While the ration of ruminant animals may vary, depending upon many factors, such as availability of high grade roughage, grain, etc., in recent years it has become a generally accepted practice to shift ruminants from their normal pasture feed which is high in cellulose content to a feed which is high in starch content and supplement the daily ration with feed concentrates or supplements, which serve to provide a source of various constituents which are otherwise entirely lacking, or deficient in, the daily ration and which are now recognized as being essential to a balanced diet or ration.

However, as is generally recognized in the art, when ruminant animals are shifted from a high cellulose ration to a high starch ration (e.g., changed from high roughage to high concentrate rations) they then take several days, or in some cases weeks, to get back to normal performance. This period is called the adaptation period. During the adaptation period, the cattle producers suffer severe economic losses as a result of the cattle having poor feed efficiencies and growth performances. The severity of these losses is based on the magnitude of the differences in the prior and present ration. In other words, the greater the differences, the longer the adaptation period, with the resultant severe economic losses.

The speed by which complete adaptation can be brought about is largely a function of the ability of the rumen microbial population to alter its metabolic response and capability with respect to the new feed being ingested. For example, should the new feed be particularly deficient in any vitamins, complete adjustment will not be obtained until the microbial population develops the ability to synthesize the required vitamins. Generally speaking, the microbial population adjusts their metabolism, to insure survival, in direct relation to the total chemistry of the ingested ration.

In summary, ARM is useful, inter alia, for administration to ruminants in several situations, including (1) shifting cattle from pasture feeding to feedlot feeding; (2) treatment of cattle with sterile or near-sterile rumen ("chronics" and "junkers"); and treatment of cattle undergoing the syndrome known as the "90-day slump."

It is well known in the art, as disclosed by U.S. Pat. No. 2,700,611 that rumen microflora can be cultured on a specific culturing broth (but not one of the type herein required). Similarly, U.S. Pat. No. 3,243,299 describes a specific method of culturing microorganisms from ruminant's rumen and adding them to monogastric feeds. This, of course, does not indicate that such cultured microorganisms can aid the ruminants digestive process. Indeed, monogastrins have little in common with the ruminant's digestive processes.

It has also been proposed in recent years, to employ naturally or artifically grown microorganisms, in admixture with non-protein nitrogen compounds and cellulosic fibrous materials (i.e., roughage) in ruminant feed rations, to improve the rate of growth, reproduction and metabolism of the microflora or microorganisms, in the rumen and reticulum of the animal. Such a procedure is disclosed in U.S. Pat. No. 2,560,830 to Turner, which issued July 17, 1951. The use of rumen microorganisms, obtained from freshly slaughtered animals, etc., for medicinal purposes, has also been proposed.

However, we have discovered that unless the rumen bacteria to be administered the ruminant are completely conditioned or adapted to the proposed total ration of the subject animal before administration, maximum benefits cannot be obtained. In essence, we have found that when a ruminant is shifted from a cellulosic diet to a high-starch (high concentrate) diet it is most advantageous to culture rumen microorganisms on a starch-containing feedstuff. Typical high-starch (concentrate) feedstuffs are corn, milo, and wheat. For example, we have discovered that rumen microbes adapted to specific nitrogen sources respond differently when subjected to different energy sources and in most cases are adversely affected when the energy source is altered. The same is true of rumen bacteria which are adapted to specific energy sources and which are then subjected to different nitrogen sources.

In summary, the present invention relates to a unique feed additive and to a method for preparing same, said additive having unexpected and surprising results when administered to ruminants having digestive upsets, resulting from imbalances of their rumen microbial population. Such imbalances may occur when the animals are shipped, placed abruptly on rations of differing compositions (e.g., changed from high roughage to high concentrate rations), etc.

Accordingly, a general object of this invention is to provide a unique feed additive for administration to ruminant animals having digestive upsets, resulting from imbalances of their rumen microbial population.

Another object is to provide a feed additive for ruminant animals, which greatly shortens the adaptation period required by the animals when fed new and different feed materials.

It is a further object of this invention to provide an improved feed additive for ruminants, said additive comprising an aqueous suspension of rumen microorganisms grown and adapted on a starch-containing ruminant feed material and having particular utility for reducing the adaptation period resulting from imbalances of the ruminant's rumen microbial population when ruminant animals are shifted from a cellulose feed ration to a starch-containing feed ration.

Another and more particular object is to provide an improved method for preparing a feed additive comprising rumen microorganisms grown and adapted in vitro on a starch-containing feed for the purpose of inoculating the animals with said additive for the enhancement of the digestion and assimilation of a starch-containing feed.

A further object is to provide a feed additive for ruminants which greatly shortens the adaptation period, when the ruminants are fed new feed rations containing non-protein-nitrogen.

A still further object is to provide a feed additive for ruminants comprising viable rumen microorganisms, adapted in vitro to a specific ruminant ration, encapsulated with a coating designed so as to minimize damage to the microorganisms by oxygen, moisture, antibiotics, minerals, etc., when admixed and stored in the dry ruminant ration, but to maximize release of the viable microorganisms in the rumen and/or reticulum of the ingesting ruminants.

Another object is to provide a method of preparing a feed additive for ruminants wherein said additive retains its effectiveness when stored for several months. More particularly, it is an object to describe methods of freezing and freeze-drying our additive so that its effectiveness is not lost even when stored for several months.

The manner in which the foregoing and other objects are achieved in accordance with the present invention will be better understood in view of the following detailed description, wherein particularly advantageous composition and method embodiments are disclosed for illustrative purposes.

One aspect of the present invention is based on our discovery that the adaptation period required by ruminant animals when fed new and different feed rations can be greatly shortened by the administration to these animals, viable rumen microflora or rumen microorganisms, previously adapted in vitro on a starch-containing medium similar in composition to the new feed material to be fed to the animals. Thus, in accordance with a method of the present invention there is provided an in vitro adaptation and fermentation system for the production of selected rumen microflora or microbes, which are grown under culture conditions designed to mimic the rumen of the animal being fed the new and specific rations. Further, and as will be described in more detail hereafter, it has unexpectedly been discovered that certain factors enhance the development of specific adapted strains of microorganisms. For example, in the adaptation of rumen microorganisms to non-protein-nitrogen (e.g., urea, biuret, ammonium sulphate, etc.) containing rations, it has been discovered that the adaptation process is greatly enhanced by the supplementation of specific vitamins, minerals, and fatty acids.

In accordance with the present invention, rumen microorganisms are obtained from a freshly slaughtered or fistulated ruminant animal or by stomach pump from an intact ruminant, using conventional procedures, as generally known in the art. The sample, containing the rumen microorganisms is strained to remove particulate and other extraneous matter. In this regard, it has been found desirable during the collection to maintain the collection flask anaerobic and at a temperature in the range of from 36°-40° C. These rumen microorganisms then serve as the stock for the propagation of the adapted strains of rumen microorganisms.

For adaptation, the microorganisms are transferred to a flask containing a nutrient broth similar in composition to that found in the rumen fluid of animals being fed the new ration. For example, the fresh rumen fluid may be transferred to a suspension of the specific feed ration in water or perferably, in a mineral solution or nutrient broth similar in composition to that of the properly diluted ruminant saliva. The mixture containing the microorganisms and suspension of the specific feed ration is incubated or cultured statically or continuously under anaerobic conditions (e.g., by bubbling carbon dioxide through the mixture), at a temperature in the range of 36°-40° C., and for a period of time or a number of stages sufficient to insure complete in vitro adaptation of the rumen microorganisms as indicated by the test procedures stated in "Adaptation Indicia," below. In the case of static fermentation or culturing of the microflora, it has been discovered that a series or number of incubation stages may be required. In this regard, the initial sample, containing the rumen fluid and suspension of the specific feed ration, may be cultured for a period of 24 hours at a temperature in the range of from 36°-40° C. At the end of this period, a portion of the incubation mixture containing the rumen microorganisms is transferred to a fresh nutrient medium and the incubation is carried out for another 24-hour period under carbon dioxide, etc. Such transfers may then be continued until complete in vitro adaptation of the rumen microflora is obtained. It has been generally observed that the rate of microbial proliferation and nutrient utilization may be low in the first few transfers. However, as adaptation proceeds these rates increase and finally plateau at an optimum. Once the adaptation criteria are achieved (See "Adaptation Indicia," below) the rumen microorganisms are considered to be adapted to the feed ration and are then ready for propagation in mass quantities on the same nutrient broth and for processing the rumen inoculum preparation.

The use of static incubation conditions for the in vitro adaptation of the rumen microflora, as described above, however, should not be considered to be limiting. In this regard, for example, it has been found that the use of a continuous fermentation technique, although requiring somewhat more elaborate equipment, shortens the period required for the in vitro adaptation. In accordance with this technique, fresh nutrient media including a suspension of the feed ration is continuously introduced into a fermentation tank previously inoculated with rumen microorganisms, maintained anaerobic, and the effluent continuously withdrawn at a rate equal to that of the feed rate. The microorganisms of the effluent are discarded until such time as complete adaptation to the feed, as herein described, is achieved.

The adapted rumen microorganisms, obtained in accordance with the static or continuous techniques, can either be left in the fermentation broth and administered to the animal as whole broth (or suitably coarsely filtered to facilitate handling in a drench syringe), or the microorganisms can be separated from the broth by conventionally known procedures, as for example, filtration, centrifugation, etc. The filtrate is discarded. It is desirable, that such manipulations, e.g., filtration, etc., be carried out under anaerobic conditions so as to obtain the maximum number of viable organisms.

As described above, when ruminant animals are subjected to a severe shift in ration composition, this will result in a severe and prolonged adaptation period. For example, it is well-known that the shifting from natural protein containing feed rations to non-protein-nitrogen (NPN) containing rations often causes ruminants to perform poorly for as long as 40–50 days. Also if NPN contributes 30% or more of the total dietary nitrogen, severe toxicity or even death may result. On the other hand if the cattle are very slowly adapted to NPN, i.e., by gradually increasing their intake over a prolonged period, good performance can eventually be obtained. This is, of course, highly impractical and uneconomical for the commercial producer. However, in accordance with the present invention, feeding of high levels of NPN to ruminants can be carried out practically and economically.

In this regard, in adapting rumen microorganisms to urea, biuret, ammonium sulphate or other NPN containing rations in vitro, it has been found to be desirable to gradually increase the levels of NPN during the culturing of the rumen microflora in the nutrient medium. For example, in the case of static incubation, the amount of the NPN added to the nutrient medium or broth, would be gradually increased with each consecutive transfer or stage. This maximizes the rates of cellular proliferation and nutrient utilization and shortens the in vitro conditioning or adaptation period required. It has also been unexpectedly discovered, that when the NPN ruminant ration used in the nutrient broth, is balanced with certain additives, including B-vitamins, fatty acids containing from 4–10 carbon atoms (e.g., isobutyric, 2-methylbutyric, isovaleric and valeric acid), and certain minerals, e.g., magnesium and potassium, a synergistic adaptation response is obtained. For example, complete adaptation by rumen microorganisms to a ration containing 100 percent of the dietary N, in the form of NPN can be obtained within 10–20% of the time normally required when the above additives are not employed.

The following examples are given as illustrative only and are not intended to limit the scope of the invention thereto.

PREPARATION AND FEEDING OF ARM
(EXAMPLES 1–7)

EXAMPLE 1

The rumen contents of a roughage-fed disease-free tested steer were withdrawn by means of a stomach pump. The contents were filtered and 50 milliliters of the strained fresh rumen fluid were transferred to a flask containing 50 grams of a feed ration, having a composition as shown in Table 1, suspended in 1 liter of water.

Table 1 (Ration I)

| Ingredient | Percentages |
| --- | --- |
| Ground corn | 56.5 |
| Ground corn cobs | 26.3 |
| Molasses | 3.5 |
| Soybean oil meal | 10.9 |

Table 1 (Ration I)-Continued

| Ingredient | Percentages |
| --- | --- |
| Minerals | 2.4 |
| Vitamins A, $D_2$, E, antibiotic premix | 0.4 |

The suspension or mixture was cultured statically under carbon dioxide for a period of approximately 24 hours at 39° C. Anaerobic conditions in the flask were effected and maintained by bubbling $CO_2$ through the mixture. At the end of this period 50 milliliters of the incubation mixture containing the rumen microorganisms were transferred to a fresh nutrient suspension containing 50 gms. of the feed ration of Table 1 and this mixture was cultured under like conditions for another 24-hour period and at 39° C. The above procedure was repeated for a third and fourth 24-hour culturing period. At the end of the fourth transfer, complete in vitro adaptation of the rumen microorganisms was obtained as indicated by tests conducted pursuant to "Adaptation Indicia," below.

The resultant broth was then suitable for use as such in inoculating ruminants. If it is to be administered as a drench, it may be given a coarse filtration to remove coarse matter that might otherwise plug a syringe. Or the microorganisms may be recovered as such, as a paste, by fine filtration, and placed in a bolus for administration via bolus gun. For other means of administration, see "Administration of ARM to the Animal," below.

For all of these examples for making ARM, once adaptation is achieved, a sample of such material can be used in "mass production" of larger quantities of broth, and the thus cultured microorganisms harvested will be in adapted form. In a typical instance of this technique, the starting microorganisms can be adapted in 100-ml flasks through the necessary stages, and in the final adapted stage the product can be used to inoculate the broth of a large scale (e.g., 40-gallon) fermentor.

EXAMPLES 2–5

The procedure of Example 1 was repeated in a series of three runs except with the substitution of the feed rations shown in Tables 2–5, for that shown in Table 1 of Example 1.

Table 2 (Ration II)

| Ingredient | Percentages |
| --- | --- |
| Ration I (of Table 1) | 60 |
| Ground alfalfa hay | 10 |
| Ground corn silage | 30 |

Table 3 (Ration III)

| Ingredient | Percentage |
| --- | --- |
| Milo (cracked) | 89 |
| Cottonseed meal | 5.0 |
| Alfalfa meal (dehydrated) | 5.0 |
| Salt and trace minerals | 1.0 |

Table 4 (Ration IV)

| Ingredient | Percentage |
|---|---|
| Alfalfa hay (ground) | 12.5 |
| Timothy (ground) | 12.5 |
| Linseed meal | 5.0 |
| Cottonseed meal | 5.0 |
| Bone meal | 1.0 |
| Trace mineralized salt | 1.0 |
| Ground corn | 63.0 |

Table 5 (Ration V)

| Ingredient | Percentage |
|---|---|
| Wheat | 89 |
| Cottonseed meal | 5.0 |
| Alfalfa meal (dehydrated) | 5.0 |
| Salt and trace minerals | 1.0 |

Each run gave ARM suitable for use in this invention, i.e., both as a further inoculant, and/or for administration to ruminants as hereinafter described.

Approximately 3 grams each of the individually adapted microbial cells obtained in Examples 1 through 5 centrifuging the broth were separately mixed with 90 grams of a carrier comprising equal parts by weight, sucrose and cellulose, and the resulting admixture transferred to gelatin capsules, as generally described above. Each capsule contained approximately 0.5 gm. of the adapted microbial cells. The individual capsules were refrigerated until time for use.

The capsules were then administered by a bolus gun to 500 lb. beef steers on the first day of feeding of a new ration having a composition identical to that of the rations used in culturing the microorganisms in Examples 1–5.

EXAMPLE 6

The microbial cells obtained in Example 1 were mixed with 90 grams of a carrier comprising equal parts by weight, sucrose and cellulose, and the resulting admixture transferred to gelatin capsules as described in Example 1. Each capsule contained approximately 0.5 gm. of the adapted microbial cells. The individual capsules were refrigerated until time for use.

The capsules were then administered by a bolus gun to 500 lb. beef steers (previously on pasture) on the first day of feeding of a new ration, Ration IV, with excellent adjustment to the new feed.

EXAMPLE 7

Forty 500 lb. steers, previously fed on pasture, were assigned by weight to each of 8 treatment lots. Two lots of 5 animals each were fed either ration 1, 2, 3 ro 4. All animals were brought to full feed in one week by increasing the amount of feed provided form an initial 5 to 10 lbs. per head, depending on the roughage content, in 2-3 lbs./head/day increments. Feed and water were than provided ad libitum with feed intake being measured daily. All animals were weighed weekly after a 12–16 fast from both feed and water. Rumen microorganisms adapted in vitro to the respective ration as described above were then administered in gelatin capsules by bolus gun to all animals in one lot of each treatment on the first and seventh day of feeding. The results are presented in Table 6.

Table 6

| | Cumulative Weight Gains/5-Head (lbs.) | | | | | | | |
|---|---|---|---|---|---|---|---|---|
| | I | | II | | III | | IV | |
| Days on Trial | Control | Inoculum | Control | Inoculum | Control | Inoculum | Control | Inoculum |
| 7 | −75 | −10 | −50 | +25 | −60 | −20 | −82 | +12 |
| 14 | −25 | +45 | +15 | +80 | −10 | +15 | −56 | +70 |
| 21 | +50 | +170 | +90 | +160 | +70 | +115 | +10 | +182 |
| 28 | +125 | +247 | +170 | +252 | +143 | +234 | +90 | +294 |
| Overall lbs. feed per lb. gain | 10.2 | 6.4 | 16.7 | 11.2 | 8.9 | 6.8 | 11.6 | 5.9 |

EXAMPLE 8

Rumen microorganisms were adapted in vitro in accordance with the procedures of Examples 1–5 to a 50 gm. sample of the rations marked A and B, (as shown in Table 7) of which 60% of the dietary N was provided by urea. In the case of the adaptation of ration B with the B-vitamin/ fatty acid/magnesium/potassium premix, complete in vitro adaptation was obtained in 4–24 hour stages whereas in adapting the microorganisms to composition (without the premix) 40 stages were required. These were then placed in gelatin capsules as described above and stored refrigerated until the time for use.

Table 7

| Rations | A, lbs. | B, lbs. |
|---|---|---|
| Ground corn | 1062 | 1062 |
| Ground corn cobs | 638 | 638 |
| Molasses | 100 | 100 |
| Urea | 51.2 | 51.2 |
| Solka Floc cellulose | 100 | 15.4 |
| Vitamins A, $D_2$, E | 0.5 | 0.5 |
| Na-Propionate | 1.8 | 1.8 |
| $ZnSO_4$ | 0.5 | 0.5 |
| $Na_2SO_4$ | 8.5 | 8.5 |
| NaCl (iodized) | 10.0 | 10.0 |
| Limestone (38%) | 3.5 | 3.5 |
| Dical. Phos. | 23.0 | 23.0 |
| $FeSO_4$ | 1.0 | 1.0 |
| B-vitamin/fatty acid/magnesium potassium premix* | — | 84.6 |
| | 2000 lbs. | 2000 lbs. |

*$B_2$, 30 gms.; $B_{12}$, 5 mg.; pantothenic acid, 200 gms.; Niacin, 60 gms.; choline chloride, 2400 gms.; $B_1$, 5.4 gms.; $B_2$, 6.0 gms.; folic acid, 600 mg.; biotin, 900 mg.; ascorbic acid, 640 gms.; magnesium oxide, 4.9 lbs.; $KHCO_3$, 65.3 lbs.; isovaleric acid, 0.25 lb.; valeric acid, 0.25 lb.; isobutyric acid, 0.25 lb.; 2-methylbutyrate, 0.25 lb.

The capsules containing the adapted microorganisms of A and B of Table 7 were then administered by bolus gun to 500 lb. beef received on the first and seventh day of the feeding of a ration identical to that of the composition of rations A and B of Table 7, with consequent rapid adaptation of the steers.

EXAMPLE 9

Five 500-lb. beef steers were assigned to each of the four treatment lots. Lots I and II were fed ration A and Lots III and IV receivedd the respective in vitro adapted rumen microorganisms. Feed and water were provided ad libitum after attaining full feed by increasing the amount of feed provided from 5 lbs/head/day initially by 1 lb./head/day increments. Full feedings were thereby attained by the 10th to 12th day of feeding. Feed consumption was measured daily and body weight measurements were taken weekly after a 12-hour fast from both feed and water. The remarkable effect of the use of the adapted rumen microorganisms, and adapted microorganisms plus the B-vitamin, fatty acid, magnesium and potassium premix, on the weight gains and feed efficiencies of 500-lb. beef steers is given in Table 8.

Table 8

| Days on Trail | Cumulative Weight Gains (lbs.) | | | |
|---|---|---|---|---|
| | I | II | III | IV |
| 7 | −46 | −35 | −34 | +12 |
| 13 | +27 | +40 | +36 | +108 |
| 21 | +118 | +182 | +165 | +262 |
| Overall ADG/hd ADG=Avg. Daily Gain | 1.12 | 1.73 | 1.57 | 2.50 |
| | Feed Consumptions (lbs.) | | | |
| 7 | 238 | 238 | 238 | 238 |
| 13 | 405 | 405 | 394 | 396 |
| 21 | 634 | 638 | 644 | 695 |
| Overall lbs. feed/lb. gain | 10.83 | 7.04 | 7.73 | 5.07 |

THE NUTRIENT MEDIUM

The nutrient medium for culturing the rumen microorganisms (in both the inoculant and fermentor stages) can comprise any feedstuff (basal ration) customarily fed to ruminants, e.g. cattle. These feeds ordinarily comprise about 45 – 95% concentrate (containing about 45–50% starch) suitably in the form of ground corn, grain (wheat), alfalfa, milo, cottonseed meal, linseed meal, soybean meal, and the like, plus forage or roughage (1–55%) such as hay, corn silage, ground corn cobs, beet pulp, and the like, plus (optionally) a small amount of molasses (0–10%), plus (optionally) a small amount (0–10%) of nutritionally conventional menerals, e.g., salts, (0–10%), plus (optionally) very minor amounts of vitamins (0–1%). The mix may also include minor amounts of other conventional ruminant nutrients, e.g., bone meal, urea, and the like.

In addition to the basal ration feedstuff described in the preceding paragraph, an artificial saliva mix may optionally be added. The use of this mix is described elsewhere (see Example 6). The overall proportions of components to each other in the basal ration are unchanged when the artificial saliva mix is used, but of course in the overall nutrient medium they would be reduced in proportion to the amount of saliva mix added.

In summary, then, the nutrient medium (aside from added water and carbon dioxide) consists essentially of:

| | Parts by Weight |
|---|---|
| Concentrate | 45 – 95 |
| Forage or roughage | 1 – 55 |
| Molasses | 0 – 10 |
| Minerals | 0 – 10 |
| Artificial saliva mix | 0 – 40 |

ARTIFICIAL SALIVA

A particularly desirable embodiment of the invention involves culturing rumen microorganisms anaerobically on a two-compenent substrate, namely (a) a high starch concentrate such as the ration described in any of the above tables and (b) an artificial saliva mix such as that shown in Table 6. The culturing is done under a carbon dioxide atmosphere. The microorganisms consume carbon dioxide as a nutritional requirement. Hence the preferred ingredients of this composition are the starch concentrate, the artificial saliva mix, and carbon dioxide gas. This novel three-component composition is in fact a major aspect of this invention.

In operating this embodiment sufficient water is added to give an easily stirrable mixture. Such amount of water is not critical and may be typically about 20 liters per kilogram of concentrate. The solids of the artificial saliva mix are preferably added in an amount to provide a ratio of 300 grams of such solids per kilogram of concentrate ration. A broadly operable range for these materials is 100–600 grams artificial saliva mix solids per kilogram of concentrate ration, and 10–40 liters of water per kilogram of concentrate ration.

This mixture can be used both in the inoculum flask and in the larger size fermentors. When used in the latter type of fermentors, the inoculum is suitably ARM, i.e., rumen microorganisms that have already been adapted to a starch concentrate. In such case the broth automatically and inherently comprises ARM.

The following example shows the use of such a mixture, using carbon dioxide.

EXAMPLE 10

500 grams of feed ration, Ration VI (See Table 9) were placed in a fermentor and the entire assembly was autoclaved for 1/2 hour at 15 lbs. of steam. 152.3 grams of an artificial saliva mix (Table 9) were added to the fermentor and the volume was adjusted to 10 liters with deionized water. The fermentor was turned on and adjusted to 400 R.P.M. and $CO_2$ was bubbled through the mixture at 1 liter/min. When the temperature reached about 39°C. the fermentor was inoculated with 1 liter of 24-hour old adapted rumen microorganisms which were cultured as in Example 1, and allowed to ferment for 8 hours. The resultant ARM broth was suitable for administration to ruminants.

Table 9

| Feed Ration VI | |
|---|---|
| Corn cobs | 38.75 gms. |
| 17% alfalfa | 26.50 do. |
| Ground corn | 342.00 do. |
| Beet pulp | 53.00 do. |
| Molasses | 13.25 do. |
| Protein supplement | 26.50 do. |
| | 500.00 gms. |

Table 9-Continued

Feed Ration VI
Artificial Saliva Mix

| | |
|---|---|
| $Na_2HPO_4 \cdot 12H_2O$ | 69.8 gms. |
| $NaHCO_3$ | 73.5 do. |
| NaCl | 3.5 do. |
| KCl | 4.3 do. |
| $MgSO_4 \cdot 7H_2O$ | 0.9 do. |
| $CaCl_2$ | 0.3 do. |

FERMENTOR EQUIPMENT

Fermentors of any conventional size and design can be used. In our work we used standard commercially available 14-liter and 30-liter fermentors. Essentially, each of these incorporated the same basic features. Both had means for automatic temperature maintenance by means of electrical immersion heaters. Both had electrically driven agitators and internal heat exchangers. Both had pH electrode ports. Also both had conventional liquids and solids addition means, as well as inlets and outlets for gas (for example, carbon dioxide). both were made of Pyrex glass.

Additional information as to start-up and use of this equipment is given below. Reference is mainly to the 14-liter vessel, which used an 11-liter liquid volume. The 30-liter fermentor took 22 liters of liquid.

FERMENTOR MAKEUP STEP

The purpose of this step is to sterilize the medium as well as the fermentation vessel itself.

Sterilization of the fermentation medium used for the production of ARM differs somewhat from conventional fermentation media (such as that which is used for the production of antibiotics) insofar as all components of the ARM medium are preferably not sterilized together in the fermentor. The reasons for sterilizing several of the components separately is largely mechanical convenience. For instance, when one steam sterilizes a solution containing large quantities of sodium bicarbonate, a great deal of effervescence is encountered and hence the medium may "foam out" of the fermentation vessel.

The concentrate-containing meals too are preferably sterilized separately. When these meals are sterilized as a solution, an appreciable amount of hydrolysis of starch is encountered yielding saccharides and simple sugars. The presence of these simple sugars favors a lactic fermentation rather than one that produces the various volatile fatty acids (acetic, propionic, isobutyric, butyric, isovaleric and valeric acid) desirable in ARM fermentation.

The fermentor, all of the salts except sodium bicarbonate ($NaHCO_3$), and the water can suitably be sterilized as a unit. This includes the $Na_2HPO_4 \cdot 12 H_2O$, NaCl, KCl, $MgSO_4 \cdot 7 H_2O$ and $CaCl_2$.

The sodium bicarbonate is preferably sterilized separately using dry heat and is then added to the fermentor aseptically. This operation is suitably carried out in a covered Pyrex beaker at 170° C for 1 hour.

The meals for the nutrient medium including the ground corn cobs, dehydrated alfalfa meal, ground corn, dried beet pulp, cane molasses on soybean millfeed and protein supplement are suitably steam sterilized separately (as a mixture) and are then added to the fermentor aseptically. This sterilization operation is suitably carried out in a covered Pyrex beaker at 250°F. (15psig) for 30 minutes.

Prior to each production run, the fermentor is charged with the water and salts (as per the above) and assembled. The stainless steel cage and head are assembled to the glass jar with airtight rubber gaskets and the $CO_2$ inlet and vent filters are connected to the appropriate ports with rubber tubing and secured with hose clamps. The gas inlet line is clamped off for autoclaving with a clamp. A sample line consisting of ⅜ inches rubber tubing is secured with a hose clamp to the sampling port and supplied with a clamp for regulation. The antifoam addition port is not needed and is closed off with a short length of rubber tubing and a clamp. The fermentor and its contents are then steam sterilized for 60 minutes at 15 psig of steam (250° F.) in an autoclave.

After sterilization the sodium bicarbonate and meals (as described above) are aseptically added to the fermentor through the addition port in the fermentor head. The fermentor assembly is finally connected to the service lines (water, electrical, and $CO_2$).

The main power switch is turned on; and the agitation is switched on and adjusted to the appropriate speed on the tachometer. The temperature control is then activated and set to "manual cooling" for one minute to prime the system. The switches are then set for "auto-cooling; heat-on," and the temperature is set for approximately 39° C. Finally, the $CO_2$ line is unclamped and gas flow is initiated at a suitable rate. (See below.)

INOCULATION STEP

The sterilized fermentor is aseptically inoculated with the equivalent of 10% fresh 24-hour old flask culture of the rumen microorganisms.

| Uninoculated Fermentor Volume | Inoculum Volume | Total Inoculated Volume |
|---|---|---|
| 10 liter | 1 liter | 11 liter |
| 20 liter | 2 liter | 22 liter |

Preparation of the inoculum per se is described elsewhere herein. See, for example, Example 1.

INCUBATION STEP

The preferred incubation (fermentation) conditions for producing ARM include the following:

| | 11 liter inoculated fermentor volume | 22 liter inoculated fermentor volume |
|---|---|---|
| Incubation Temperature | 39° C. | 39° C |
| Agitation Rate | 400 RPM | 310 RPM |
| $CO_2$ Gas Flow Rate | 62.5 cc/min. | 125 cc/min |
| Internal Pressure | atmospheric | atmospheric |

The fermentation is terminated when the broth pH goes down to pH 6.0 ± 0.1 which occurs (on the average) after 7.1 hours of incubation. It is at pH 6.0 that we have obtained not only the maximum number of microbes possible but also have the maximum stability during subsequent storage.

CHILL STEP

The fermentor and its contents are then preferably chilled to about 60° F. via the internal heat exchanger within the fermentor. This step, which takes approximately 60 minutes, is important insofar as it "arrests" the growth and metabolic activities of these microbes.

SCREENING (COARSE FILTRATION) STEP

In the past we have found that some of the meals used in the fermentation medium have a tendency to plug several of the drench guns used for administering ARM in the field. For this reason the whole broth is preferably strained through a stainless steel screen (whose pore size is 1/16 inches) to remove these large, coarse particles. The final broth, whether or not screened, has a specific gravity of 1.01.

If the product is not to be administered via syringe, or is to be given in a manner where the coarse particles are not disadvantageous, then the coarse screening may be omitted.

RUMINANT SHIFTED FROM ROUGHAGE TO CONCENTRATE

In a typical method of using the adapted rumen microorganisms (or ARM) the ruminant is shifted from its normal pasture roughage to an 87% concentrate feedstuff (i.e., 13% roughage, 87% starch-containing feed) and immediately supplied with the ARM. The ruminant receives the same dosage of ARM (e.g., 12 ounces of broth) for the first 3 days after being transferred to the 87% concentrate. From the 4th day on, the ARM can generally be omitted from the diet. In another typical method of administration, the ruminant is transferred from the pasture roughage to a 65% concentrate feedstuff and given the normal dosage of the ARM the first 3 days following the transfer, and 5 days after the initial transfer the ruminant is transferred to a 75% concentrated feedstuff, followed by another transfer to an 87% concentrated feedstuff 5 days later. Again the ARM is fed to the ruminant only on the first 3 days following the initial transfer.

The following examples 11-20 deal with the use of ARM in shifting the ruminant from pasture or roughage to a high concentrate feedstuff. Unless otherwise stated, the animals involved were steers, and on the average, at start, weighed 500-600 lbs.

EXAMPLE 11

1,200 ml. (about 1,220 gms.) of whole broth prepared as in Example 10 ($1-5 \times 10^8$ microorganisms per ml.) were admixed with 1,000 gms. of number 5 mesh exfoliated vermiculite and spread by hand onto 75 lbs of an 87% concentrate (87% milo, wheat, and corn, and 13% roughage on a dry basis). An absorptive inert carrier such as exfoliated vermiculite is optional but serves the convenient purpose of helping to spread the microorganisms uniformly over the feed. When such carrier is used, a weight ratio of aqueous microorganism suspension:carrier of about 0.5-5:1 is preferred. The weight ratio of whole broth: total feedstuff mixture was therefore about 1:29, or about 1:28, on the basis of omitting the vermiculite. The mix was fed to 10 steers once a day for three days. As is common practice in the cattle industry, on the same day, a second feeding was made of another 75 lbs. of the same feedstuff (excluding broth and vermiculite), so that the actual overall ratio was about 1:56. A control group of ten steers was fed the same feedstuff without the adapted rumen microorganisms (ARM) for a period of 3 days. Ten more steers were fed the feedstuff and ARM (for 3 days) but the ARM was only 0.1 the amount allowed to the first ten steers. Ten more steers were fed the same feedstuff and ARM for 3 days but the amount of ARM was 3.0 times the amount fed the first ten steers. The results are given in Table 10. 1.0 N ARM is defined as 1,220 gm. (2.7 lb.) of ARM broth mixed with 150 lbs. of feedstuff (exclusive of vermiculite) or in other words, a weight ratio of 1:56 (excluding vermiculite). These results indicate in all cases the 1.0 N ARM and the 0.1 N ARM were more effective in improving the weight gain of the steer than the untreated feedstuff. The 3.0 N ARM showed improvement initially. Table 11 reports the corresponding feed efficiencies. Details are given following the Tables. The legend "Roughage → 87% Conc." means that steers that had been on roughage were changed over to 87% starch concentrate, the other 13% of the feed being roughage. The legend "Roughage → 65% → 75% → 87%," etc., means that the change was made step-wise, increasing the starch-containing concentrate at each step.

Comment: Since there are typically $1-5 \times 10^8$ microorganisms per ml. or per 1.02 gm., and since in these examples one steer is fed or offered 1,220/10 or 122 gm./day, one steer is evidently fed 122/1.02 to $(122/1.02)^5 \times 10^8$, or about 120 to 600 $\times 10^8$ microorganisms in a daily ration of what we call "1.0 N ARM" feeding. Based on the estimated actual count of adapted rumen microorganisms, the useful range is actually much broader, and can be, for example, $10^6 - 10^{12}$ microorganisms. Larger amounts are operable, but are unnecessary from the technical viewpoint. Smaller amounts are likewise operable, but may lengthen the ruminant's adaptation time to the new feed, and are thus economically undesirable. The aforesaid quantity of adapted rumen microorganisms (as broth) can be offered the ruminant in various ratios in the ultimate feed mixture. Ratios of 1:29, and 1:56 have been mentioned. Actually, the range is largely one of the feeder's convenience, and an ARM (broth or broth equivalent)-:feed weight ratio in the range of about 1:10-10,000 is operable; preferably, 1:20-1,000 is used.

Table 10

| Feeding Regimen | Cumulative Average Daily Gains (lbs/hd/day) | | | |
|---|---|---|---|---|
| | 27 day | 55 day | 83 day | 111 day |
| (Example 11) | | | | |
| Roughage → 87% Conc. | | | | |
| 0.1 N ARM | 6.84 (+10.5%) | 5.09 (+18.0%) | 4.54 (+ 9.1%) | 4.05 (+ 6.97%) |
| 1.0 N ARM | 6.54 (+ 5.7%) | 4.77 (+10.6%) | 4.47 (+ 8.0%) | 4.00 (+5.4%) |
| 3.0 N ARM | 6.54 (+ 5.7%) | 4.64 (+ 7.7%) | 4.12 (− 1.0%) | 3.58 (− 6.7%) |
| Control | 6.19 | 4.31 | 4.16 | 3.79 |
| (Example 12) | | | | |
| Roughage → 75% | | | | |
| Conc. → 87% | | | | |
| Conc. | | | | |

Table 10—Continued

AVERAGE DAILY GAINS

| Feeding Regimen | Cumulative Average Daily Gains (lbs/hd/day) | | | |
|---|---|---|---|---|
| | 27 day | 55 day | 83 day | 111 day |
| 1.0 N ARM | 6.93 (+19.9%) | 4.90 (+18.2%) | 4.41 (+13.1%) | 3.70 (+5.9%) |
| Control | 5.78 | 4.15 | 3.90 | 3.50 |
| (Example 13) Roughage → 65% → 75% → 87% Conc. | | | | |
| 1.0 N ARM | 6.78 (+8.7%) | 4.40 (+1.9%) | 4.33 (+7.0%) | 3.67 (+3.0%) |
| Control | 6.24 | 4.32 | 4.06 | 3.56 |
| (Example 14) Roughage → 55% → 65% → 75% → 87% Conc. | | | | |
| 1.0 N ARM | 6.39 (+3.9%) | 4.74 (+9.6%) | 4.30 (+9.5%) | 3.60 (+7.8%) |
| Control | 6.15 | 4.32 | 3.93 | 3.34 |

Table 11

FEED EFFICIENCIES

| Feeding Regimen | Cumulative Feed Efficiency (lb. feed/lb. gain) | | | |
|---|---|---|---|---|
| | 27 day | 55 day | 83 day | 111 day |
| (Example 11) Roughage → 87% Conc. | | | | |
| 0.1 N ARM | 4.14 (+5.3%) | 6.71 (+5.0%) | 8.18 (−5.3%) | 9.57 (−5.6%) |
| 1.0 N ARM | 4.30 (+1.6%) | 6.76 (+4.3%) | 7.69 (+0.8%) | 9.055 (+0.1%) |
| 3.0 N ARM | 4.16 (+4.8%) | 6.84 (+3.1%) | 8.25 (−6.0%) | 9.95 (−8.9%) |
| Control | 4.37 | 7.06 | 7.77 | 9.060 |
| (Example 12) Roughage → 75% → 87% Conc. | | | | |
| 1.0 N ARM | 4.13 (+17.7%) | 6.6 (+16.1%) | 7.77 (+9.7%) | 9.75 (+3.0%) |
| Control | 5.02 | 7.87 | 8.60 | 10.05 |
| (Example 13) Roughage → 65% → 75% → 87% Conc. | | | | |
| 1.0 N ARM | 4.74 (+8.9%) | 7.67 (+6.6%) | 8.06 (+9.3%) | 9.91 (+5.9%) |
| Control | 5.20 | 8.21 | 8.88 | 10.53 |
| (Example 14) Roughage → 55% → 65% → 75% → 87% Conc. | | | | |
| 1.0 N ARM | 5.65 (−0.04%) | 7.54 (+4.3%) | 8.41 (+5.3%) | 10.40 (+2.6%) |
| Control | 5.63 | 7.88 | 8.87 | 10.68 |

EXAMPLES 12-14 (SEE TABLES 10,11)

In Example 12 the steers were initially transferred from roughage to a 75% concentrate feedstuff containing ARM on the first 3 days, and then on the 5th day, the 87% concentrate was used. In Example 13 the ARM was mixed with a 65% concentrate and on the 5th and 10th days 75 and 87% concentrate feedstuffs, respectively, were used. In Example 14 a 55% concentrate was used initially, followed by the 65% concentrate on the 5th day, the 75% concentrate on the 10th day and the 85% concentrate on the 15th day. As can be seen in Table 10, in all cases the ARM increased the daily weight gain more rapidly than an identical control. Table 11 reports the corresponding Feed Efficiencies.

EXAMPLES 15-18

Examples 11-14 were repeated respectively as Examples 15-18 except that the ARM was mixed with the feedstuff on the first day only. The results showed very little difference when compared with the results reported in Tables 10 and 11.

EXAMPLE 19

The procedure of Example 10 was followed. 500 grams of Ration VI (Table 9) were placed in a fermentor and the entire assembly was autoclaved for ½ hour at 15 pounds of steam. One liter of ARM inoculant broth and 152.3 grams of an artificial saliva mix (Table 9) were added to the fermentor. The whole was adjusted to 10 liters with deionized water. The fermentor was turned on and adjusted to 400 R.P.M. and $CO_2$ was bubbled through the mixture at 1 liter/minute for about 8 hours. 600 grams of glycerol was then added to the mixture and the whole was centrifuged at 20,000 − 25,000 g. The centrifuged product was decanted leaving about 1 liter of ARM product. This was frozen to a temperature of about −20° C. by inserting the container (containing the 1 liter), into a freezer for about 1 hour. 30 days later the frozen ARM was thawed and spread over an 87% concentrate feedstuff. Results equally as good as Example 11 were obtained.

EXAMPLE 20

One liter of whole broth was prepared as in Example 19 and then the whole was freeze-dried as follows: the whole was centrifuged and approximately 900 ml. were decanted; 10 grams of glucose were added to the remaining 100 ml. and this mixture was put into a container and then into a refrigerator where it remained at a temperature of $-20°$ C. for 24 hours; the frozen mixture was then placed into a drier where a vacuum was applied until pressure in the freeze-drying container reached 25 $\mu$ of Hg (about 15 minutes); after about 24 hours the temperature had risen to 25° C. and the freeze-dried material was then removed. The whole was then pulverized. 28 grams of the pulverized material was mixed with ½ pound of starch and the whole was applied to 15 pounds of ration VI. The results were very similar to those obtained in Example 11.

TREATMENT OF CHRONICS

The ARM product of this invention is particularly useful in the treatment of steers known as chronics or junkers. In this case ARM is not used as a prophylactic, to help adjust the animal to a starch concentrate feed. Rather it is used to supply a suitable rumen microflora population in cases where the animal has already lost so much of its rumen bacteria that it is for the time being unable to digest any kind of feed, whether rich in roughage or rich in starch.

This condition can be brought on by one or more of several causes, for example, an abrupt change in diet; or overeating; or stress brought on by shipping; or systemic weakness or disease. Signs and consequences typically exhibited are:

1. Depression with hanging of the head and reluctance to move.
2. Staggering gait.
3. Loss of appetite.
4. Fast, weak pulse.
5. Grinding of teeth and groaning.
6. Diarrhea.
7. Distended abdomen which may feel doughy to the touch or be bloated.
8. Absence of rumen movements.
9. Gurgling sounds in the rumen indicating gas bubbles raising through rumen fluids.
10. Normal to subnormal temperature.
11. Recumbency and death may result in severely affected animals.
12. Animals that recover may suffer from laminitis which results in permanent lameness.

In one test, 16 chronics (steers exhibiting the above symptoms) were treated. The treatment consisted of drenching each steer with a single dose of 12 ounces of ARM broth. All of the 16 animals responded within 24 hours. Their appetites returned and their general appearance improved. During this treatment these steers were offered water and feed ad libitum. The feed was like that of Feed Ration VI in Table 9. At the end of two weeks all the animals had completely recovered.

Besides alleviation of symptoms in the animal the improvement brought about by the treatment with ARM can be measured quantitatively in the rise in rumen count, rise in pH, drop in lactic acid, and rise in volatile fatty acids in the rumen.

Table 12 below shows such quantitative improvements in the rumen per se of these chronics. Three days after treatment with ARM the rumen contents were judged normal.

An in VIVO Study Showing How Arm is Effective in Counteracting Ruminal Imbalance

| | Intra-Ruminal Measurements | | | | | |
|---|---|---|---|---|---|---|
| | Viable Microbial Count no./ml | pH | Lactic Acid | | Volatile Fatty Acids | |
| Time | | | mg/ml | % change** | mg/ml | % change** |
| 1 day before | $3 \times 10^2$ | 5.45 | 0.34 | | 2.3 | |
| Day of treatment* | $7 \times 10^2$ | 5.5 | 0.43 | | 5.8 | |
| 1 day after | $1 \times 10^4$ | 5.7 | 0.317 | $-18\%$ | 7.9 | $+122\%$ |
| 2 days after | $6 \times 10^6$ | 6.1 | 0.024 | $-94\%$ | 7.6 | $+114\%$ |
| 3 days after | $3 \times 10^8$ | 6.5 | 0.000 | $-100\%$ | 7.1 | $+100\%$ |

\* Treatment consisted of a 12 oz. oral drench of ARM broth.
\*\*Based on an average of two determinations made before treatment.

TREATMENT OF "NINETY-DAY SLUMP"

Most veteran cattle feeders have observed that after approximately 90–100 days of full feeding or attaining a weight of 800–1,000 pounds, a reduction in rate and efficiency of gain often occurs in feedlot cattle. This has been referred to as the "90-Day slump." Our work has shown that "90-Day slump" can be effectively treated with ARM. Such treatment stimulates increased gain and efficiency during the final stages of the feeding period.

SUMMARY

Two 60-day trials utilizing 200 mixed breed steers were conducted to determine the effects of 0, 3, 6, or 12-ounce drenches of ARM (whole broth made per Example 10) on subsequent feedlot performance. An 85 percent concentrate ration was fed for a 90-day preliminary period prior to drenching with ARM.

Steers receiving the 12-ounce treatment in Trial I gained 14.4 pounds more per head for the 60-day feeding period following drenching. The 6-ounce level of ARM was useful but not as beneficial as the 12-ounce. As a curious anomaly, the 3-ounce level was not as good as the control.

The 12-ounce treatment in Trial II produced a highly significant increase in rate of gain and a 12.5% increase in efficiency of feed utilization when compared to the control group.

PROCEDURE

Two hundred mixed breed steers were fed ration composed of 15% sorghum silage and 85% concentrate (rolled milo and supplement) for a preliminary 90-day period. In Trial I, 100 steers were randomly allotted to 20 pens of 5 head each and drenched with ARM as indicated in Table 1. The other 100 steers were utilized in Trial II with 50 steers receiving a 12-ounce drench of ARM and the remaining steers serving as controls. Individual weights were obtained on two consecutive days at the beginning and end of each trial with an intermediate weight taken 30 days after drenching. All groups were fed the same ration twice daily. Carcass weight and grade was collected for each steer. Groups were not fed antibiotics or stilbestrol.

Table 13

| | Experimental Design — Trial I | |
|---|---|---|
| No. Pens | No. Steers | Treatment |
| 8 | 40 | control |
| 4 | 20 | 3 ounces ARM |
| 4 | 20 | 6 ounces ARM |
| 4 | 20 | 12 ounces ARM |

Feedlot performance is shown in Table 14. Drenching steers after a preliminary 90-day full feeding period with 12 ounces of ARM produced a highly significant increase in animal performance compared to undrenched controls. Steers receiving 6-ounce treatment gained 10.1 pounds more per head than control steers for the 60-day feeding trial but this difference was not as great as the 14.4 and 20.0 pounds increased gain for the 12-ounce treatment in Trials I and II, respectively. Gain and efficiency for the 3-ounce treatment were the poorest.

Steers receiving the 6-ounce treatment required 4.3% less feed per pound of gain than control steers while the 12-ounce treatments were 7.6% and 12.5% more efficient than the controls in Trials I and II respectively. There were no significant differences in carcass grades due to treatment.

tic acid test and the VFA test, although, frequently, if it meets one it will also meet the other. It is sufficient that the product meet only one of the tests to be ARM.

A change of conditions can drastically alter results in tests for determining adaptation. By way of example, we can mention the following. Product shown to be ARM by the lactic acid method, as determined in 500 ml of material, and showing zero lactic acid, can actually show 0.3 – 0.7 mg/ml lactic acid following fermentation of an 11-liter batch using such ARM as inoculant. Nevertheless, the fermentation batch will show suitably high levels of VFA and will be ARM. Conversely, a culture done at the 500 ml level may show VFA of 0.6 – 2.0 mg/ml; but if it shows = 0.05 mg/ml lactic acid under the test conditions, it is ARM.

These two test procedures will now be described.

THE VFA TEST

The VFA system simply involves culturing the rumen microorganism through whatever stages are necessary to provide a fermentation liquor analyzing total volatile fatty acids (VFA) of at least about 3.5 mg/ml, such determination being made under the conditions hereinafter specified. The values can of course be higher. 3.7–4.0 mg/ml is typical. The average of 10 runs in the 11-liter fermentor (by the procedure herein given) was 5.29 mg/ml. We have seen values of 6–7 mg/ml and higher.

The aforesaid amount of VFA is obtained by measurements taken after the standard 8-hour fermentation described in Example 10 and in Table 9.

It will be evident that several factors are necessary to define adaptation, namely inoculum, nutrient medium, and fermentation conditions. Thus when we state an adaptation indicator of at least about 3.5 mg/ml VFA, this refers to VFA in the broth resulting from:

Table 14

Performance of Steers Drenched with Various Levels of ARM

| Trial | No. Head | Treatment | Initial Weight, lb. | Final Weight, lb. | Total Gain, lb. | Average Daily Gain, lb. | Daily Dry Matter Intake, lb. | Feed/ lb. Gain, lb. |
|---|---|---|---|---|---|---|---|---|
| I | 40 | Control | 005.2 | 1038.3 | 133.1 | 2.22 | 22.01 | 9.92 |
| | 20 | 3 ounce | 901.9 | 1027.9 | 126.0 | 2.10 | 22.64 | 10.78 |
| | 20 | 6 ounce | 902.7 | 1045.9 | 143.2 | 2.39 | 22.68 | 9.49 |
| | 20 | 12 ounce | 902.5 | 1050.0 | 147.5 | 2.46 | 22.57 | 9.17 |
| II | 50 | Control | 922.0 | 1052.5 | 130.5 | 2.18 | 22.56 | 10.35 |
| | 49* | 12 ounce | 914.1 | 1064.6 | 150.5 | 2.51 | 22.75 | 9.06 |

* 1 steer died during trial.

ADAPTATION INDICIA

Since the crux of this invention is the use of rumen microorganisms that have been adapted to a ruminant feed containing a high percentage of concentrate, it is important to know when the microorganisms have been so adapted. Adaptation will occur inherently if the cultures are taken through a large number of culture stages or transfers on a high concentrate medium, say 15 or 20 stages. However, in most cases adaptation will occur long before this, and there are ways to determine such adaptation.

There are two tests for the rapid determination of adaptation: the volatile fatty acids (VFA) test and the test for laevo-lactic acid. The latter is carried out on inoculant preparations of rumen microorganisms and the former on fermentation broths. Both procedures should be followed meticulously as given below.

It is not required that the product meet both the laca. using an inoculum of 1 liter of rumen microorganism fluid, said fluid being either fresh from a bovine ruminant that is adapted to a high concentrate feed or preexisting as a culture of rumen microorganisms and having a trypticase soy agar count of $10^5 - 10^{10}$ microorganisms/ml.

b. using as nutrient broth, the mixture defined in Table 15 below:

Table 15

| 87% Concentrate | |
|---|---|
| Ingredient | Grams |
| Ground corn cobs | 38.75 |
| Dehydrated alfalfa meal | 26.50 |
| Ground corn | 342.00 |
| Dried beet pulp | 53.00 |
| Cane molasses on soybean meal feed | 13.25 |
| Protein supplement* | 26.50 |

Table 15

87% Concentrate

| Ingredient | | Grams |
|---|---|---|
| $Na_2HPO_4 \cdot 12H_2O$ | ⎫ | 69.80 |
| $NaHCO_3$ | ⎪ | 73.50 |
| NaCl | ⎪ | 3.50 |
| KCl | ⎬ Artificial Saliva | 4.30 |
| $MgSO_4 \cdot 7H_2O$ | ⎪ | 0.90 |
| $CaCl_2$ | ⎭ | 0.30 |
| Deionized Water | | 9,347.70 |
| | | 10,000.00 |

*The protein supplement was prepared by mixing the following ingredients:

| Ingredient | Amount |
|---|---|
| Soybean meal | 30 lb. |
| Dehydrated alfalfa meal | 22.5 lb. |
| Meat meal | 15.0 lb. |
| Urea | 9.5 lb. |
| Dicalcium phosphate | 5.0 lb. |
| Ground limestone | 3.25 lb. |
| NaCl trace minerals | 12.5 lb. |
| Vitamin A, D, and E premix | 2.9 grams | c. fermentation conditions,
  i. 39° C. fermentation temperature.
  ii. broth stirred at 400 rpm.
  iii. $CO_2$ added to fermentor at 1 liter/min.
  iv. fermentation time, 8 hrs.

The entire medium (the 87% concentrate in Table 15 above) is ground in a Wiley mill to pass a 4 mm screen. This is a fairly coarse feed. Feed of this coarseness is "hay, corn fodder, straw, and silage belong to this class. Some of the low-grade milling by-products, such as oat hulls, ground corn cobs, and cottonseed hulls are roughages rather than concentrates, for they are high in fiber and are low in feeding value."

To compare adaptation indicia for different types of rumen organisms, experiments were carried out wherein rumen from a hay-fed steer, rumen from a steer fed an 87% concentrate, and a previously cultured rumen fluid, were all fermented in the same nutrient medium under the same conditions.

selected in making adaptation tests for two reasons: (1) It is the same kind of feed that is customarily fed a ruminant, as to content and texture; and (2) only adapted rumen microorganisms show efficiency in converting concentrates of this coarseness to volatile fatty acids. Comment: even unadapted rumen microorganisms can utilize pure fine ground starch with at least modest efficiency. Such is not the case if the starch source (e.g., ground corn) is coarse ground as in commercial feedstuffs, e.g., as above described.

Using all the above conditions, if the resulting broth analyzes at least about 3.5 VFA, the rumen microorganisms in the broth are adapted (ARM). As a corollary, in the general case, it can also be concluded that the inoculant microorganisms that went into the fermentor were likewise adapted.

Volatile fatty acids, as the term is used above, include acetic, propionate, isobutyric, butyric, isovaleric, valeric, and perhaps trace amounts of a few other. With respect to nutritional requirements of the animal, acetic is the most important, followed by propionate and butyric acids. ARM converts starch largely into acetic acid, with smaller amounts of propionate and butyric acids.

Following customary usage in this art, "percent concentrate" refers to the amount of grains and other starch containing feed components. For example "87% concentrate" would mean that the feed (i.e., in this case the nutrient medium used in the fermentor) contains 87% "concentrate" and that the remaining 13% is roughage. Specifically in the above table the 65.25 grams of roughage (ground corn cobs and dehydrated alfalfa meal) comprises 13% of the total of roughage and concentrate. The 87% concentrate is the aggregate of 434.75 grams of ground corn, dried beet pulp, cane molasses on soybean meal feed, and protein supplement. Thus the percentage does not refer directly to the exact amount of starch either in the concentrate portion or in the roughage portion.

The terms "concentrates" and "roughage" are used in the conventional sense. See, for example, the following definitions given in Morrison, F. B., Feeds and Feeding, 22d. Ed., PP. 15–16 (1959):

"Concentrates and roughages. These terms are convenient to separate feeds into two general classes upon the basis of their fiber content and the amount of total digestible nutrients they furnish. Concentrates are feeds that are low in fiber and high in total digestible nutrients. Examples of this class of feeds are the various grains and the high-grade by-products, such as hominy feed, wheat bran, cottonseed meal, linseed meal, corn gluten feed, meat scraps, etc. ***

Roughages are feeds that are high in fiber and therefore low in total digestible nutrients. Such feeds as In each case one liter of rumen fluid or rumen culture was used as the inoculant.

The rumen microorganism culture used as such had been prepared in accordance with the procedure of Example 1, and was known to be "adapted" as a result of prior experiments.

The steer that had been fed the concentrate, had been regularly fed a concentrate made up as follows:

Table 16

87% Concentrate

| Ingredient | Pounds |
|---|---|
| Ground corn cobs | 38.75 |
| Dehydrated alfalfa meal | 26.50 |
| Ground corn | 342.00 |
| Dried beet pulp | 53.00 |
| Cane molasses on soybean meal feed | 13.25 |
| Protein supplement* | 26.50 |

*The protein supplement was prepared by mixing the following ingredients:

| Ingredient | Amount |
|---|---|
| Soybean meal | 30.0 lb. |
| Dehydrated alfalfa meal | 22.5 lb. |
| Meat meal | 15.0 lb. |
| Urea | 9.5 lb. |
| Dicalcium phosphate | 5.0 lb. |
| Ground limestone | 3.25 lb. |
| NaCl and trace minerals | 12.5 lb. |
| Vitamin A, D, and E premix | 2.9 grams |

With regard to the rumen fluid drawn from the steer fed the 87% concentrate, it was assumed that the microorganisms in that fluid were inherently adapted to the concentrate, and this assumption was verified in the course of the experiments. On the other hand we knew from previous experience that the rumen fluid from the hay fed steer would not show adaptation under the fermentation conditions, and would in fact give a relatively low VFA. This too was borne out by the work.

In carrying out these tests, as we have said, one liter of each of the three inoculating materials was used. This was added to the 14-liter fermentor, and the conditions stated immediately above (a, b, and c) were Table 17

| INOCULUM | pH | Acetic Acid | Propionic Acid | Isobutyric Acid | Butyric Acid | Isovaleric Acid | Valeric Acid | Total VFA | Trypticase Soy Agar Count |
|---|---|---|---|---|---|---|---|---|---|
| Hay-Fed Rumen Fluid | 7.0 | 1.9 | 0.5 | 0 | 0.3 | Trace | 0 | 2.7 | $6.5 \times 10^5$ |
| Conc.-Fed Rumen Fluid | 7.0 | 1.7 | 1.3 | 0 | 0.3 | Trace | Trace | 3.4 | $4.2 \times 10^7$ |
| ARM Flask | 5.6 | 1.4 | 1.4 | 0 | 0.8 | Trace | 0.2 | 3.9 | $7.9 \times 10^7$ |

TABLE 18

| FERMENTOR (8 hr.) | pH | Acetic Acid | Propionic Acid | Isobutyric Acid | Butyric Acid | Isovaleric Acid | Valeric Acid | Total VFA | Trypticase Soy Agar Count |
|---|---|---|---|---|---|---|---|---|---|
| Hay Fed Rumen Fluid | 6.1 | 0.8 | 0.6 | 0 | 0.1 | 0 | 0 | 1.5 | $2.2 \times 10^9$ |
| Conc. Fed Rumen Fluid | 6.25 | 1.5 | 2.0 | 0 | 0.5 | Trace | Trace | 4.0 | $9 \times 10^5$ |
| ARM Flask | 6.4 | 1.7 | 1.5 | 0 | 0.6 | Trace | 0.2 | 4.0 | $2 \times 10^8$ |

Table 19

Rumen Cultures, Lactic Acid in mg/ml of Broth

| Day | Run 104 | Run 1121 | Run 117 | Run 105 | Run 626 | Run 627 | Run 330 | Run 130P |
|---|---|---|---|---|---|---|---|---|
| 0 | 0.020 | 0.013 | 0.011 | 0.006 | 0.015 | 0.003 | 0.000 | 0.010 |
| 1 | 0.747 | 0.777 | 0.787 | 0.712 | 0.699 | 0.663 | 0.571 | 0.475 |
| 2 | 0.697 | 0.304 | 0.787 | 0.646 | 0.369 | 0.268 | 0.008 | 0.183 |
| 3 | 0.100 | 0.648 | 0.726 | 0.018 | 0.022 | 0.023 | 0.013 | 0.111 |
| 4 | 0.024 | 0.420 | 0.669 | 0.007 | 0.000 | 0.000 | 0.009 | 0.060 |
| 5 | 0.017 | 0.451 | 0.342 | 0.001 | 0.000 | 0.000 | 0.010 | 0.404 |
| 6 | 0.015 | 0.006 | 0.210 | 0.011 | 0.000 | 0.001 | 0.008 | 0.480 |
| 7 | 0.008 | 0.011 | 0.030 | 0.024 | 0.012 | 0.000 | 0.025 | 0.182 |
| 8 | 0.024 | 0.000 | 0.021 | 0.001 | 0.000 | 0.032 | 0.021 | 0.123 |
| 9 | 0.005 | 0.000 | 0.010 | 0.011 | 0.006 | 0.001 | 0.000 | 0.014 |
| 10 | 0.005 | 0.002 | 0.012 | 0.003 | 0.002 | 0.018 | 0.002 | 0.245 |
| 11 | 0.004 | 0.001 | 0.013 | 0.006 | 0.005 | 0.014 | 0.002 | 0.158 |
| 12 | 0.008 | 0.002 | 0.013 | 0.009 | 0.007 | 0.000 | 0.000 | 0.075 |
| 13 | 0.018 | 0.002 | 0.017 | 0.011 | 0.013 | 0.028 | 0.000 | 0.046 |
| 14 | 0.015 | 0.024 | 0.000 | 0.021 | 0.021 | 0.016 | 0.013 | 0.023 |
| 15 | 0.031 | 0.030 | 0.004 | 0.022 | 0.012 | 0.010 | 0.032 | 0.022 |
| 16 | 0.019 | 0.044 | 0.018 | 0.018 | 0.000 | 0.001 | 0.000 | 0.034 |
| 17 | 0.014 | 0.043 | 0.032 | 0.019 | 0.000 | 0.009 | 0.008 | 0.027 |
| 18 | 0.023 | 0.035 | 0.048 | 0.017 | 0.000 | 0.000 | 0.012 | 0.023 |
| 19 | 0.012 | 0.033 | 0.039 | 0.005 | 0.000 | 0.004 | 0.003 | 0.040 |
| 20 | 0.004 | 0.013 | 0.026 | 0.003 | 0.012 | 0.001 | 0.004 | 0.026 |
| 21 | 0.007 | 0.008 | 0.011 | 0.015 | 0.009 | 0.016 | 0.000 | 0.011 | used in the experiments.

Referring first of all to Table 17 below, this table gives the properties of each of the three one-liter portions of inocula that were added to the fermentor. For example the pH of the hay-fed rumen fluid was 7.0, its VFA was 2.7 mg/ml and so on. Comparable data are given for the properties of the one liter portions for concentrate-fed rumen fluid and for the ARM culture.

As we have said, each of these one liter inocula was used to inoculate an additional ten liters of nutrient mix (see Table 15 above), and then the mix was fermented for 8 hours. At the end of this time samples were withdrawn from the fermentor, and each was examined. The results of these samples are given in Table 18.

THE LACTIC ACID TEST

In brief, this test involves culturing a specimen of rumen microorganisms under highly specific conditions and analyzing the resultant broth for laevo-lactic acid. If the lactic acid is 0.05 mg/ml or less, the rumen microorganisms in the broth are considered adapted; i.e., they are ARM.

The test procedure is as follows:

Into a 750 ml culture flask is placed 450 ml of nutrient medium of the mixture of Table 15. For example, the 10,000 g. batch there described can be made up, and 450 ml of that batch taken. Then 50 ml of rumen microorganism inoculant is placed in the flask. This rumen microorganism can be from any source. For example it can be the latest in a series of cultures, run as in Example 1, aiming at adaption. Or it can be directly from a hay-fed or concentrate-fed steer. Or it can be a presumed ARM, being retested for continuing identity as ARM. Or it can be any other specimen of interest.

The flask is swept continuously with carbon dioxide through a sintered glass sparger which, being under the liquid surface, adequately agitates it. The flask is maintained at 39°C. for 24 hours. At the end of this time the procedure is discontinued, and the broth is tested for lactic acid.

When following adaptation of a rumen specimen from a hay-fed steer, the lactic acid of the starting specimen is generally very low, e.g., 0.0 to 0.02 mg/ml. Then, on first exposure to concentrate, it will jump to a very high level, e.g., 0.6 – 0.7 mg/ml. With succeeding transfers or culture stages, lactic acid drops. In some cases the critical adaptation drop may be abrupt and dramatic. The course of lactic acid levels is shown in several typical runs in Table 19 below. In each of these runs, the initial specimen was 50 ml of rumen fluid from a hay-fed steer. It was cultured with 450 ml nutrient as above described, and then 50 ml of that broth used as the inoculant for the next culture stage, followed by succeeding cultures similarly inoculated by 50 ml from the preceding broth.

The runs in the above Table will bear discussion. Referring to Run 104, this shows a rather idealized system of transfers. The rumen sample at the start contains 0.020 mg/ml lactic acid. In the first culture (Day 1) at the end of 24 hours the broth contains 0.747 mg/ml lactic acid. This high level is brought about by the change from hay to concentrate in the nutrient medium for the rumen microorganisms. This high level of lactic acid continues into the second transfer, Day 2. Day 3 shows a drastic drop in lactic acid level to 0.100 mg/ml, which shows that the rumen microflora are becoming adapted. However, the lactic acid level is not yet acceptably low. On Day 4, the lactic acid level has now dropped to 0.024 mg/ml. The transfers were continued for a total of twenty-one days (and in fact somewhat longer) and at no time during the ensuing sequence of transfers did the lactic acid level reach an unacceptably high concentration. The transfer for Day 4 which gave 0.024 mg/ml lactic acid indicated an adapted rumen microorganism.

Run 117 is somewhat like Run 104 except that adaptation was more gradual and took about twice as long. Runs 105, 626, 627, and 330 showed very rapid adaptations. In fact, Run 330 showed adaptation on the second transfer, Day 2, for a lactic acid concentration of 0.008 mg/ml. Run 130 P was the slowest of the series to reach adaptation. This sequence shows on Day 4 a lactic acid level of 0.060. However, this trend was immediately reversed on the following two days. Lactic acid began to fall again on the seventh day and reached a pseudo-acceptable level on Day 9 (0.014 mg/ml). However, the trend was reversed again on the 10th day when the level reached 0.245 mg/ml, and from this level it fell gradually to an acceptable level of 0.046 mg/ml on the 13th day. From thence forward it stayed at an acceptable level. In view of the "reversal" on and after Day 9, we prefer to make three transfers in sequence, all giving $\leq$ 0.05 lactic acid, before we consider that the microorganisms are ARM.

L-lactic acid is determined in the known way. Our analytical procedure is based on the Boehringer-Mannheim Lactate Test Kit, available commercially. In principle, l-latic acid is converted to pyruvic acid in the presence of diphosphopyridine nucleotide and lactic dehydrogenase. The hydrogenated diphosphopyridine nucleotide produced in this reaction is measured spectrophotometrically at 366 m$\mu$. See Hoborst, H. J. in H. U. Bergmeyer: Methods of Enzymatic Analysis, Verlag Chemie Weinheim, 1st edition, 1962, p. 622; and Laudahn, G., Klin. Wschr. 37, 850 (1959).

Decreasing l-lactic levels indicates that the rumen microbe population is successfully converting lactic acid to volatile fatty acids (the chief energy sources available to the ruminant), and this in turn means that the rumen microbe population is becoming adapted to the concentrate feed and/or culture.

ADMINISTRATION OF ARM TO THE ANIMAL

Once the ARM is made in the broth it can be given to the ruminant in a number of different ways.

The best and simplest way known to us is simply to give the animal a drench of whole broth. The drench can be given by means of a conventional syringe. As already discussed, if the broth has gross material in it that might plug the orifice of the syringe, then it is preferred that the broth be given a coarse filtration prior to use. This removes coarse matter while retaining the ARM. Prior to use the broth, whether or not filtered, can be stored. It will last indefinitely without change if stored at a temperature of 0° to 4° C. Actually it can be stored at room temperature for about one week without harm. The reason for the latter possibility is that, when harvested at a pH of 6, there is still sufficient nutritional matter in the broth, so that if the microorganisms begin to grow again, for example by reason of failure of refrigeration, or by deliberate exposure to room temperature, the microorganisms will have available sufficient food for several days.

The amount of broth to be given an animal depends to some extent on the body weight of the animal. For example with steers, we have found that the volume of drench per 600–1,200 pounds of animal body weight should be in the range of about 3–20 ounces, suitably 12 ounces. This is given once a day, for as many days as the program requires. Generally, in converting a steer from roughage to concentrate, not more than three days is required to help the steer become adjusted.

A 12-ounce drench for steers is useful and typical. However, we have used 3 and 6-ounce drenches on steers with good results. A drench volume in excess of 20 ounces is operable but is generally unnecessary. A 12-ounce drench may contain $10^6 - 10^{12}$ microorganisms as determined by the trypticase soy agar (TSA) count method. As is known, this method counts only viable organisms and of these, only organisms that will grow on this particular agar medium. The actual count is therefore presumed higher. Using the TSA count, ARM in Table 18 shows a low of $9 \times 10^5$ per ml and a high of $2 \times 10^8$. For 12 ounces, these figures are multiplied by the number of milliliters in 12 ounces, or about 352, to give about $3 \times 10^8$ and about $7 \times 10^{10}$ respectively. Since this is out typical dosage for a typical steer in the weight range of 500–1,200 lbs., these numbers may, if desired, be prorated to obtain dosages for other ruminants, i.e., cattle, sheep, and goats, weighing more or less than the said 500–1,200 lb. weight range, and whether the animal is well or sick. Actually, as a practical matter, one can use a 12-ounce drench of whole broth for all ruminants regardless of species or weight.

In certain cases it may be advantageous to mix the microbial cell paste (obtained by centrifugation or filtration of the broth with a carrier, as for example, a mixture of sugar (e.g., lactose) and cellulose), and to then transfer the resulting mixture to a gelatin or other type conventional capsule known in the art. The capsules can then be stored at normal refrigeration temperatures if they are to be used within a short period of time. For long term storages it is preferable to store the capsules in a sharp frozen state. The capsules can be administered to the cow via bolus gun.

Also, the adapted rumen microorganisms can be simply admixed with the feed ration to be fed to the cattle. In this latter administration mode the microorganisms can be microencapsulated using techniques to minimize processing exposure to oxygen and coating materials which are minimally permeable to oxygen and other materials in the dry feed which are noxious to the microorganisms, but which coating materials readily dissolve in the rumen fluids when ingested by the ruminant thereby releasing the live and unaltered microorganisms. Methods of microencapsulation are disclosed, e.g., in U.S. Pats. Nos. 2,800,457 and 2,800,458. Such microencapsulated in vitro adapted rumen microorganisms are preferably admixed with the specific feedstuffs to be fed the ruminants.

When the ARM product is added to, or mixed with, the ruminant's feed, this can be done by pouring broth on the feed, or by adding encapsulated ARM to the feed, or by mixing centrifuged (or filtered) ARM paste with the feed. Other modes of addition are also suitable. The amount, however added, should be sufficient to provide about $10^6 - 10^{12}$ microorganisms. For a ruminant eating 30–50 lbs. of total feed/day (concentrate and forage), this means the addition of about $2 \times 10^4$ to $3.3 \times 10^{10}$ microorganisms/lb. of feed. Broth made by the preceding examples (and starting from a precultured ARM inoculant) normally contains $10^8 - 10^9$ microorganisms/ml, or about $3 \times 10^9 - 3 \times 10^{10}$/ounce, or about $3.6 \times 10^{10} - 3.6 \times 10^{11}$ per 12 ounces, but the count may vary somewhat from batch to batch. Bacteria counts are readily made by those skilled in the art, so this feature is easily determined. Accordingly, then, in a typical and simple case, 12 ounces of broth (screened or unscreened) can be added directly to the feed. As we have mentioned, this can provide about $10^6 - 10^{12}$ microorganisms.

Another method of preparing ARM for administration to the ruminant is to freeze the material as soon as it is ready for use. This is done by any of several means including placing the container of microorganisms into an acetone/dry ice bath, placing said container in liquid nitrogen, or placing said container into a freezer. Generally it is desirable to lower the temperature of the additive to about $-20°$ C. The amount of time required to attain this temperature varies with the method used and takes only a matter of seconds when liquid nitrogen is used, to an hour when a freezer is utilized. At a later time the additive can be thawed and spread over the feed.

Another method of preparing the additive for administration is to freeze-dry the whole broth, (i.e., the cultured aqueous suspension). This is accomplished by centrifuging the whole broth until approximately 9/10 of it can be decanted; decanting and adding 10% based upon the weight of the remaining whole broth of glucose to the remaining whole broth; freezing this mixture in a refrigerator; placing the frozen mixture into a drier; subjecting it to reduced pressure, and allowing the frozen mixture to gradually warm to room temperature. When needed, the additive can be mixed with an inert carrier and applied across the feed.

When the additive is frozen or freeze-dried it is preferable to mix the whole broth with a cryo-protective agent such as glycerol, sucrose, glucose, casein, and whey. A suitable ratio is 100 parts of whole broth to 6 parts of cryo-protective agent. The purpose of the cryo-protective agent is, of course, to protect the microorganisms from damage during the freezing process.

While particularly advantageous composition and method embodiments of the present invention have been described and illustrated by examples, it will be recognized by those skilled in the art that various changes and modifications can be made therein without departing from the scope of the invention defined by the appended claims. For example, as should be readily apparent to those skilled in the art, a great number of rations for ruminant animals comprised of various feedstuffs can be formulated so as to meet the basic nutrient requirement of the animal. Thus, the compositions of the rations used in the examples should not be considered limiting.

What is claimed is:

1. A method for preparing a feed product for ruminants, comprising the steps of: introducing viable microorganisms isolated or cultured from the rumen fluid of a ruminant animal into a nutrient mixture consisting essentially of an aqueous suspension of a starch-containing concentrate feed ration comprising a member selected from the group consisting of grain, alfalfa, milo, cottonseed meal, linseed meal, and soybean meal, culturing said suspension under carbon dioxide at a temperature in the range of 30°–50° C. through stages sufficient to insure complete in vitro adaptation of the rumen microorganisms to said feed ration, and collecting said adapted rumen microorganisms to form said feed product; adaptation being determined by at least one of the following procedures A and B;
  A. a one-liter culture, cultured on 87% concentrate feed with artificial saliva mix for 24 hours at 39° C., analyzes $\leq 0.05$ mg/ml l-lactic acid;
  B. an 11-liter fermentation culture, cultured on 87% concentrate feed with artificial saliva mix for 8 hours at 39° C., analyzes $\geq 3.5$ mg/ml volatile fatty acids.

2. The method of claim 1 wherein said suspension is cultured at a temperature in the range of 36°–40° C.

3. The method of Claim 1 wherein said feed ration comprises corn.

4. The method of claim 1 wherein said feed ration includes a non-protein-nitrogen source selected from the group consisting of urea, ammonia, ammonium sulfate, and biuret.

5. The method of claim 4 wherein said feed ration comprises B-vitamins, fatty acids containing 4–10 carbon atoms, and magnesium and potassium minerals.

6. The method of claim 1 wherein said culturing of said viable microorganisms is carried out statically, said static culturing including a multi-step procedure comprising culturing, in a first step, a first sample containing rumen microorganisms, in a suspension of a concentrate feed ration for a period of about 24 hours at a temperature in the range of 36°–40° C., transferring a portion of the thus cultured rumen microorganisms to a second nutrient medium comprising said concentrate feed ration and culturing said portion for another 24-hour period at a temperature in the range of 36°–40° C., and repeating the above procedure until complete adaptation of the rumen microorganisms is obtained.

7. The method of claim 1 wherein the aqueous suspension of said starch-containing concentrate ration also includes an artificial saliva mix and is diluted by a factor in the range of 0.1 to 25; and after adaptation, there is added a cryo-protective agent selected from the group consisting of glycerol, sucrose, glucose, casein, and whey; following which the mixture is centrifuged and the filtrate removed; the remaining rumen microorganism material is frozen; and thereafter it is thawed and spread over a chosen concentrate feedstuff.

8. The method of claim 7 wherein the remaining rumen microorganism material is frozen to a temperature in the range of 0° F. to 30° F.

9. The method of claim 1 in which an artificial saliva mix is added to the nutrient mixture before culturing.

10. The method of claim 9 wherein the process comprises additionally the following steps: centrifuging the cultured suspension; decanting about 9/10 of the centrifuged suspension and discarding it; adding to the residue about 10% based upon the weight of the residue of a cryo-protective agent selected from the group consisting of glycerol, sucrose, glucose, casein, and whey; freezing the mixture; placing the frozen mixture into a drier and pulling a vacuum until the moisture in said mixture is substantially removed.

11. The method of claim 1 wherein the collected aqueous suspension of adapted rumen microorganisms is mixed with an absorptive inert carrier wherein the weight ratio of suspension; inert carrier is in the range of 0.5–5:1.

12. The method of claim 11 in which the inert carrier is vermiculite.

* * * * *